March 31, 1953 H. M. FLEMING, JR 2,633,564

PLAYBACK CIRCUIT FOR MAGNETIC RECORDINGS

Filed Nov. 30, 1950

INVENTOR
HOWARD M. FLEMING, JR.
BY George H. Lorch
ATTORNEY

Patented Mar. 31, 1953 2,633,564

UNITED STATES PATENT OFFICE 2,633,564

PLAYBACK CIRCUIT FOR MAGNETIC RECORDINGS

Howard M. Fleming, Jr., Orange, N. J., assignor to Monroe Calculating Machine Company, Orange, N. J., a corporation of Delaware Application November 30, 1950, Serial No. 198,391

3 Claims. (Cl. 340—174)

Figure 1:
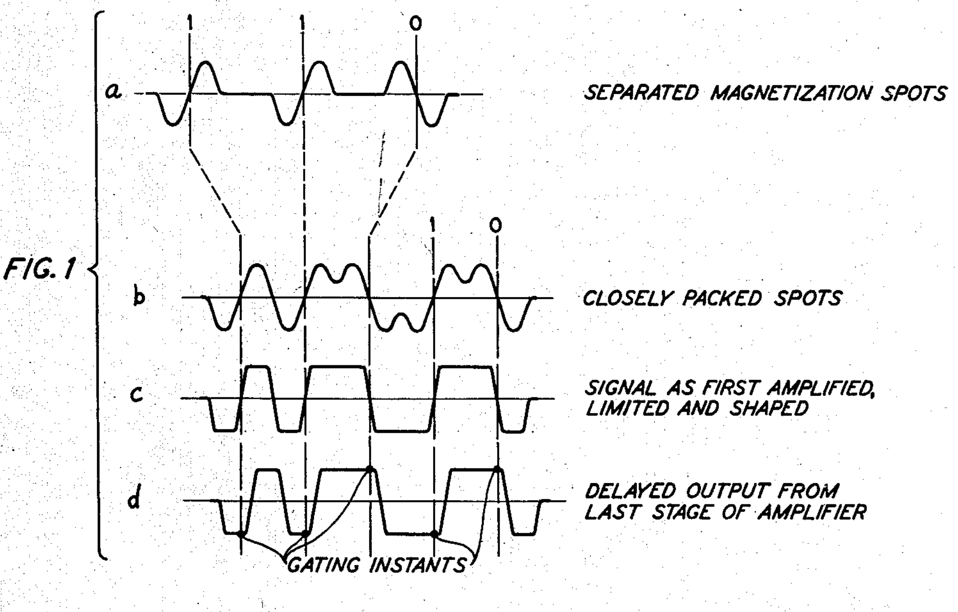

This invention relates to playback circuits for magnetic recordings. It is particularly useful in the playback of coded pulse recordings as made for electronic computers. The coded information may be of literal or numerical significance. For computing operations the binary system of enumeration is frequently used, or else a coded decimal system wherein each of the ten digits is represented by an appropriate 4-element code combination. The present invention is generally useful for playback of pulse recordings regardless of the code system that may be adopted.

When the playback is to be obtained by scanning a magnetic recording track on the periphery of a constantly revolving drum it is a well known practice to first record the pulses in well defined and evenly spaced spots, the location of which is determined by means of precisely timed gating pulses emanating from a pulse generator. The frequency of the generator is a function of the revolution speed of the drum. The instant of occurrence of a gating pulse will be referred to hereinafter as a "record time." The cadence at which record times are recurrent will be understood to correspond with the rate of scanning of adjacent magnetization spots on the drum.

Certain requirements of an electronic computer include the playback of information as previously recorded on a magnetic drum. If the pulse output from a playback circuit is found to drift away from the record times, then complications arise in the utilization of the playback signals. The phase shift of the playback signals would then require a corresponding phase shift between two gating pulse trains from the above mentioned generator. This would involve using a time delayed pulse train for the gating of succeeding operations in an electronic computer. Therefore it is a primary object of this invention to eliminate the need for more than one gating pulse train, or more than one series of record times. This object is achieved by means presently to be described. The principal characteristic of this means is that it enables the playback circuit to deliver pulses in exact synchronism with the record times and without any integral pulse-time delay.

A secondary object is to provide means for distinguishing between the polarities of different magnetization spots along a record track so that the coded data may be readily utilized in subsequent computing operations or for visually indicating its significance.

There is a practical limit to the density of spot recordings on the periphery of a magnetic drum. This limit varies as a function partly of the peripheral speed and partly of the brevity of the recording pulse. But it is more dependent upon an unavoidable spread of the lines of force adjacent the pole pieces of the scanning head.

Magnetic recording techniques have now been developed to the point where little further gain can be expected in minimizing the spread, or "fringe effect" of the magnetization spots. The assumed optimum of the spot density factor having been reached empirically, I have found it possible to take advantage of this fringe effect. The potential induced in the playback head builds up gradually as a result of the fringe effect and while the magnetization spot approaches the magnetic axis of the pole pieces in the scanning head. The voltage, being proportional to the rate of change of the magnetic flux, levels off and reverses itself at the instant when scanning the approximate center of the spot.

The playback circuit arrangement which is of the essence of my invention is particularly useful in conjunction with electronic computers and the like, because it enables gating operations to be performed at the exact instant of passage of the magnetization spot across the gap between the pole pieces of the scanning head. Thus, a succession of different operations of an electronic computer is capable of being performed while maintaining the different gating instants in step, or in synchronism with a basic gating pulse cycle.

Figure 2:
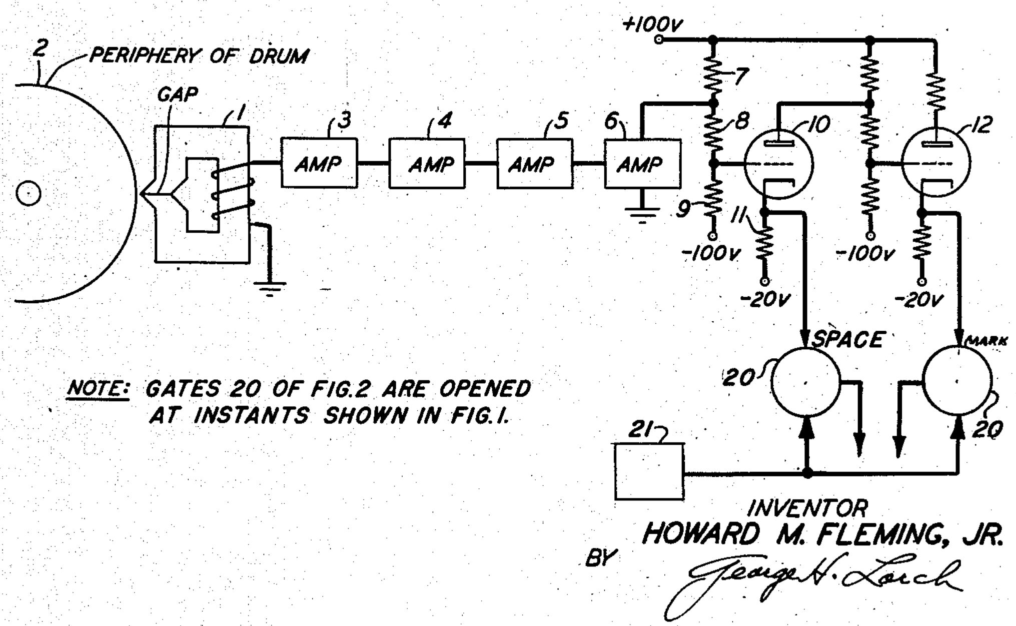

My invention will now be described in more detail, reference being made to the accompanying drawings in which Fig. 1 shows four curves *a*, *b*, *c* and *d* which are related to one another and are all drawn to the same horizontal time scale. They indicate wave shapes of signals dealt with in a scanning operation, curve *a* being under different conditions than those of the other curves;

Fig. 2 is a schematic circuit diagram illustrative of a preferred embodiment of the invention.

Referring first to Fig. 1, curve *a* therein shows a typical signal wave as generated in a playback scanning head when scanning a series of recorded pulses on a magnetic drum, the spacing of the magnetized spots being so separated that there is no overlap of the fringe effect. Curve *b* shows a modified form of signal wave produced in the same manner, but with a closer "packing" of the magnetized spot on the drum. Here there is an overlap of the fringe effect sufficient to prevent the return of the potential to zero level between the trailing end of one pulse and the leading end of a succeeding pulse of opposite polarity.

In curve *b* of Fig. 1 it will be observed that each full cycle of the potential curve of the signal wave is smoothly joined to another cycle, provided that they represent the scanning of successive spots of the same polarity. Assuming that the recording is a storage of binary digits, then the graphs represent the binary numeral 11010. The magnetized spots produce a leading end half cycle of negative polarity to indicate numeral "1" and of positive polarity to indicate numeral "0". Where the record of a "0" follows that of a "1" there is a slight dip between positive potential peaks, this dip being of no real significance. When the wave is amplified, limited and shaped this dip disappears and two adjacent half-cycle peaks of the same polarity are bridged. Curve *c* shows the wave after limiting and shaping. Curve *d* shows the same wave slightly delayed by the inherent action of the several stages of amplification, the curve itself being considered the output from amplifier 6 as shown in Fig. 2. The extent of the delay action may be varied to meet any particular requirements by the use of capacitors.

The evenly spaced vertical lines which extend through the three curves *b*, *c* and *d* are axes of symmetry for each full wave as per curve *a* and for the transition moments shown in curve *c*. These lines also represent timing instants which are preferably chosen for the gating of pulses into any desired utilization device. The black spots which are intersected by these lines in curve *d* show how the plus and minus signals may be differentiated. The possibility of this differentiation will be clearly seen as attributable to the delay action of the amplifier stages. The timing of such a gating action is coincident with the passage of each magnetization spot center under the pole pieces of the playback head.

Referring now to Fig. 2, I show therein a playback head 1 positioned to scan the periphery of a magnetic drum 2. The winding of the playback head may be grounded at one end and may feed into the input circuit of an amplifier stage 3. This amplifier stage may, if desired, be followed by other stages 4, 5 and 6. The number of stages is not important. A limiting action of any of the amplifier stages is desirable for obtaining the rectangular wave characteristic and is accomplished in a well known manner.

Amplifier 6 in one form of my invention may have an output circuit which comprises a voltage divider consisting of three sections 7, 8 and 9. This voltage divider is connected between a direct current source of 200 volts, for example, the positive terminal being, of course, a feeder for the anode. The cathode of this stage will be understood to be grounded and a normal 0-volt grid bias is obtained at the mid-point of this voltage divider. The most negative section 9, of the aforementioned voltage divider constitutes a grid bias resistor for a cathode follower tube 10. The cathode of tube 10 is connected through a resistor 11, to a biasing source terminal of —20 v. and is directly connected to a utilization circuit which is intended to respond to 0-volt pulses in representation of space signals.

Mark signals may also be obtained by the use of another cathode follower tube 11 having similar circuit parameters to those of tube 10, but being controlled by the latter and so constituting an inverter stage. It will be apparent that the tubes 10 and 11 are alternately conductive, so that in the absence of a space signal, a mark signal will be derived as output from the cathode of tube 12. It is common practice in the electronic computer art to perform gating operations by means of synchronization pulses. For example, reference is made to Patent No. 2,540,654, to A. Cohen et al., wherein pulse trains for synchronizing the operation of playback gates are produced by a pulse generator operating under control of recordings in a timing or synchronizing track of a magnetic drum. A simple exemplification of the manner in which such gating and pulse generating means are applicable to the means of the present invention is shown in Fig. 2 wherein the mark and space output lines from tubes 10 and 12 are applied to coincidence gates 20 which are opened at the appropriate times by pulses from a pulse generator 21 synchronized with the drum. When magnetic recorders are required for recording and playback purposes, these synchronizing pulses may be used again and again for different switching operations between one and another of the component sections of a computer. It will be apparent that there is considerable advantage in being able to perform these switching operations so that one chain of synchronizing pulses may be utilized for all gating purposes. This advantage is of the essence of my invention. It will also be apparent from the foregoing description of my invention that when the gating operations are performed coincidently with respect to scanning the spot centers on a magnetic record, there is no need to provide more than one chain of synchronized gating pulses. In other words, there is no need to consider that one gating operation need be delayed with respect to another gating operation.

I claim:

1. A playback circuit for magnetic recordings comprising a scanning head in which voltages are induced upon scanning the magnetization spots of a coded data record, said scanning head having its two poles separated by a small gap, means for amplifying and wave-shaping said voltages, a source of sharply defined gating pulses, and means responsive to said gating pulses for differentiating said voltages as to their components of mark and space significance, said means being operative in substantial coincidence with the passage of each sensed magnetization spot center past the gap between pole pieces of said scanning head.

2. In a playback circuit for deriving information from a spot-magnetized record track, a scanning head and amplification circuit therefor, a source of sharply defined gating pulses synchronized with the passage of magnetization spot centers past the magnetic axis of said scanning head, and means including amplifier structure having an inherent delay characteristic for delivering output potentials at the instants of said gating pulses, these output potentials being of a high or a low level depending on the polarity of the scanned magnetization spot.

3. Means for sensing a magnetic recording track having a series of magnetic spots of alternate polarities densely packed therein with the fringes of adjacent spots overlapping, including a playback head scanning the track, an amplifying and pulse shaping circuit driven by said head and having a time delay characteristic equal to the time delay between presentation of the advance fringe and of the center of a spot to the playback head, and gating means controlled to permit output from said circuit only in coincidence with the presentation of a spot center to the playback head.

HOWARD M. FLEMING, JR.

REFERENCES CITED

The following references are of record in the file of this patent:

UNITED STATES PATENTS

| Number | Name | Date |
|---|---|---|
| 2,252,380 | Kahn | Aug. 12, 1941 |
| 2,550,427 | Potts | Apr. 24, 1951 |
| 2,564,403 | May | Aug. 14, 1951 |